United States Patent [19]
Kaslow

[11] 3,959,624
[45] May 25, 1976

[54] CODED MERCHANDISING COUPON

[76] Inventor: Walter Kaslow, 380 Lafayette St., New York, N.Y. 10003

[22] Filed: Dec. 13, 1974

[21] Appl. No.: 532,586

[52] U.S. Cl. .................. 235/61.11 E; 235/61.12 N; 235/61.7 B
[51] Int. Cl.² .................. G06K 7/14; G06K 19/06; G06K 15/02
[58] Field of Search ............... 235/61.11 R, 61.11 D, 235/61.11 E, 61.7 B, 61.12 N, 61.12 R; 250/568, 569, 570; 340/149 A; 194/4

[56] References Cited
UNITED STATES PATENTS

| | | | |
|---|---|---|---|
| 3,414,731 | 12/1968 | Sperry | 250/569 |
| 3,573,436 | 4/1971 | Berler | 235/61.12 N |
| 3,632,995 | 1/1972 | Wilson | 235/61.12 N |
| 3,641,315 | 2/1972 | Nagata | 235/61.7 B |
| 3,711,683 | 1/1973 | Hamisch | 235/61.12 N |
| 3,717,750 | 2/1973 | Gilberg | 235/61.11 E |
| 3,845,277 | 10/1974 | Voss | 235/61.7 B |
| 3,852,571 | 12/1974 | Hall | 235/61.7 B |

Primary Examiner—Daryl W. Cook
Assistant Examiner—Robert M. Kilgore

[57] ABSTRACT

A redeemable merchandising coupon entitling its holder to a specified discount on a particular consumer item, the coupon having printed thereon not only the name of the item and the amount to be taken off the purchase price, but also code indicia. The code indicia has a first component which matches the universal product code (UPC) assigned to an item in question and a second component indicative of the fact that this item is subject to discount. When the holder purchases a group of items in a supermarket and the UPC indicia on these items are scanned at a check-out lane by a UPC system so that the terminal of the system may determine the names and prices of the group of items purchased and provide a receipt listing these items and the total to be paid, the same scanner thereafter serves to scan the two components on the coupon presented at the check-out lane. If the first component matches any one of the UPC indicia in the group of items previously scanned, the second component is then recognized and the terminal accords to the purchaser the specified discount which is taken into account in the total to be paid.

4 Claims, 5 Drawing Figures

CODED MERCHANDISING COUPON

BACKGROUND OF THE INVENTION

This invention relates generally to merchandising coupons, and more particularly to redeemable coupons adapted to be processed automatically by a universal process code supermarket system.

As noted by the Progressive Grocer, the Magazine of Super Marketing (November 1974), in an article entitled "What's Behind the Coupon Boom," it is expected that by the end of 1974 at least 50 billion merchandising coupons will have been printed and distributed. Even if only 10 percent of these coupons are redeemed, the total cost of supporting all coupons in 1974 is estimated to run in excess of 500 million dollars.

A merchandising coupon is often referred to as a "cents-off" certificate, for the holder of the coupon, when he purchases a given product from the retailer, is given a specified discount on this product. Such coupons fall into two basic classes—those printed and put into distribution by manufacturers directly, and those which retailers print for use in their stores.

The great majority of merchandising coupons are authorized by the manufacturer of the product so that the manufacturer is required to pay the face value of each coupon redeemed, plus certain handling charges. For example, the Coca-Cola Company, in 1972, ran ads which included a coupon offer 15 off towards the purchase of a carton of eight Coca-Cola bottles. The retailer who accepted this coupon gave the purchaser of the carton a 15 reduction on the market price thereof. The retailer was then entitled to recover from the manufacturer this 15 discount, plus a few cents for handling costs.

While in some instances coupons accepted by the retailer are redeemed by sending them directly back to the company making the product, most coupons first go through a clearing house. There are various kinds of clearing house operations. In one type, the clearing house immediately pays the retailer cash for the estimated value of the coupons, the difference between the estimated and actual amount being later credited.

After the coupons have been sorted according to manufacturers and denominations, they are shipped by the clearing house to the respective manufacturers who then invoice the money payable to the clearing house. The handling by the clearing house of any shipment of coupons by the retailer usually involves invoicing between 200 to 300 manufacturers. This applies whether the original package has 1000 coupons in it or 100,000 coupons.

Typical clearing house operations add considerably to the cost of processing merchandising coupons. But an even more serious problem is that of misredemption. This has many facets, for in quite a number of cases, it is the consumer who expects a cooperative grocer to accept coupons without purchasing the item to which the coupon is applicable, while in other instances it is the check-out clerk who brings coupons to work, puts then in his cash drawer, and takes cash out.

In some cases it may be the local charitable group that collects coupons and redeems then without the required purchases. Also responsible for misredemption is the retail store manager who pumps substantial quantities of coupons into the redemption stream to reduce his "shrink." According to the above-cited article in the Progressive Grocer, misredemptions have risen to an almost ridiculous proportion—20% to 30% for manufacturers' coupons and still higher for those coupons distributed by stores.

While various schemes have been proposed to reduce misredemption losses, such as improved auditing to ensure that clearing houses adhere to strict criteria, and procedures requiring proof of performance by retailers, they have not significantly cut down misredemptions. As reported recently in The New York Times, "misredemption and store-level larceny of cents-off coupons. . .has been estimated at 100 dollar million a year." Ultimately, it is the consumer that foots the bill for multi-million dollar coupon cheating, in that a manufacturer who pays for misredeemed coupons, in order to stay profitable, tends to pass the cost thereof to the consumer by way of higher prices.

Another difficulty experienced with standard merchandising coupons is that they are not compatible with modern supermarket computerized check-out systems which utilize the universal product code (UPC). To appreciate this difficulty, one must bear in mind that in less than fifty years, the grocery industry has evolved from one characterized by small neighborhood stores to an industrial giant with many supermarkets, and that the variety of foods and household goods now available to the consumer in many supermarkets has grown from less than 3,000 items in 1946 to over 8,000 items.

The UPC system is designed to cope not only with the problem of efficiently and accurate handling the enormous number of items sold in a modern supermarket, but also with the matter of pricing these items. In this system, instead of marking each item of merchandise with its selling price and revising the marking on the box or container every time a price change is made, the item only carries a symbol in the form of code indicia. At the check-out counter, the symbols appearing on the items purchased by the consumer are examined by an optical scanner whose output signal identifies each item as it is pulled across the scanner. The signal is sent to a terminal that automatically retrieves the item's name and price from a memory bank which is readily updated.

The terminal then displays a description of the item and its price, and it performs all of the calculations necessary for tax and change. The terminal prints a customer receipt listing and identifying all of the items purchased, giving the prices of items and the total amount to be paid.

Thus personnel at the check-out counter are relieved of the need to read the price appearing on the item and are not required with the UPC marked items to operate the keyboard on a register to enter the price of the items purchased, for these functions are carried out automatically by the system. But when the customer presents to a clerk at the check-out counter a "cents-off" coupon, then the existing UPC system is incapable of coping automatically with this transaction.

It is for this reason that existing UPC systems, such as the IBM 3660 supermarket system, are provided with a manually-operated digital keyboard functioning in conjunction with a mode keyboard. On the mode keyboard, separate keys exist for food stamps, refunds and other special situations, as well as for store merchandising coupons and manufacturers' merchandising coupons.

When a customer presents a manufacturer "cents-off" coupon, the clerk has to press the manufacturer's coupon key on the mode keyboard, after which he is required to key in the amount of the discount on the digital keyboard, so that a proper discount is accorded to the customer by the terminal. The discount is printed at the terminal and appears on the receipt.

This procedure for merchandising coupons is obviously time-consuming and subject to human error, and since, as explained previously, the current volume of merchandising coupons being traded is enormous, the productivity of the UPC system is materially impaired by the need to manually process such coupons. Moreover, the problem of misredemption is not alleviated by existing UPC systems, for the system honors these coupons, whether or not a purchase is made.

SUMMARY OF INVENTION

In view of the foregoing, it is the main object of this invention to provide a merchandising coupon which is compatible with a UPC supermatket system, whereby such coupons may be processed automatically, thereby obviating the need for manual procedures.

More particularly, it is an object of the invention to provide a merchandise coupon having UPC indicia thereon which minimizes the possibility of misredemption and affords a running account of the number of valid coupons accepted, thereby simplifying auditing and redemption procedures.

A significant advantage of a merchandise coupon in accordance with the invention when used in combination with a standard UPC supermarket system modified to automatically accept and process such coupons, is that it makes it possible for the processing of the coupon to be integrated with all other informational and auditing aspects of such systems. This allows for the capture of previously unavailable data as to the number of the coupons being traded in given areas, or other data necessary in evaluating the effectiveness of a coupon program.

Briefly stated, these objects are attained in a merchandising coupon which identifies a particular product and the "cents-off" for which the holder who purchases the product is entitled, the coupon also carrying code indicia having a first component which matches the UPC indicia assigned to the identified product and a second component indicative of the fact that the purchaser thereof is entitled to a discount.

The coupon, though useable in a conventional manner in any retail establishment which sells the identified product and accepts "cents-off" coupons, is especially useful in a supermarket equipped with a UPC computer-based system, for when the holder of the coupon purchases a group of items in the supermarket, which group includes the identified product, and then brings the items to the check-out lane, the items in the group are scanned in the usual manner so that the system terminal can determine the names and prices thereof, and provide a receipt listing the items and the total to be paid.

The same scanner thereafter serves to scan the coupon. Means associated with the scanner and the terminal function to determine on the basis of the first scanned component on the coupon whether a corresponding UPC symbol was included in the group of items previously scanned, and if a match is found, the second component is then recognized, and the terminal accords to the purchaser the proper discount in the total to be paid.

Inasmuch as the system will not deduct from the total to be paid unless the coupon is applicable to an item in the group previously scanned, it is not possible for the clerk to accept a coupon without the item being purchased, nor for the clerk to exchange coupons for cash. Nor is it possible to otherwise misredeem the coupons, for the coupon will not be recognized and honored unless an appropriate purchase is made.

OUTLINE OF DRAWING

For a better understanding of the invention as well as other objects and further features thereof, reference is made to the following detailed description to be read in conjunction with the accompanying drawing, wherein:

FIG. 5 is a block diagram of a UPC supermarket system modified to accept a UPC merchandising coupon.

DESCRIPTION OF INVENTION

While the invention is not limited to any one type of commercially-available UPC supermarket system, it will be described in connection with an IBM 3660 system in that the structure and function of this system are fully disclosed in manuals and other texts published by IBM. These publications, including the manual entitled "IBM 3660 Supermarket System: Introduction (GA 27-3076)," are incorporated herein by reference.

Figure 1:
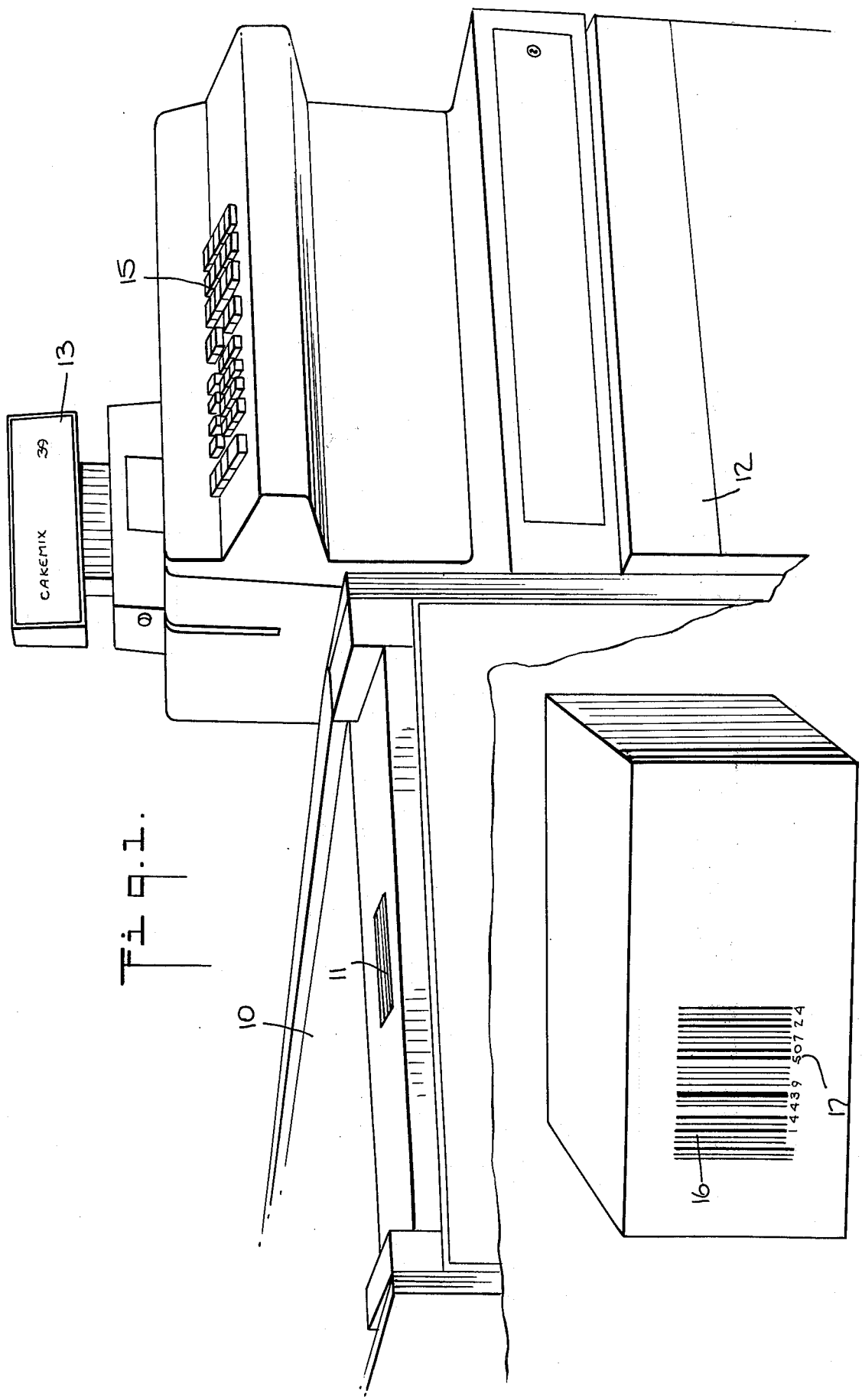
FIG. 1 is a perspective view of an installed UPC supermarket system.
Figure 2:
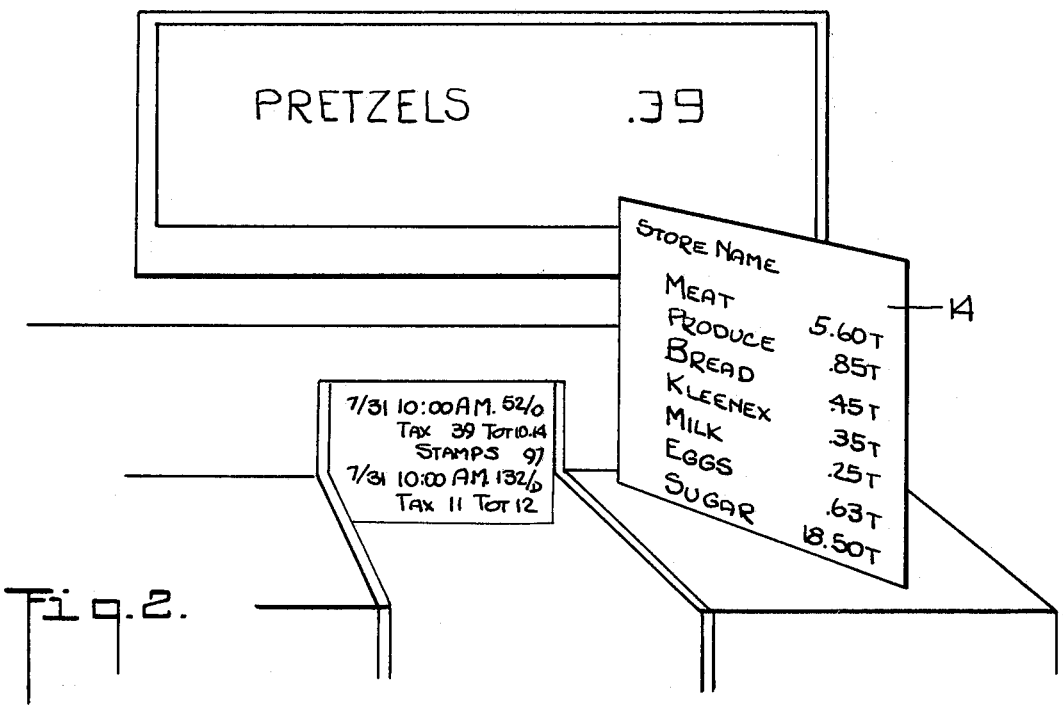
FIG. 2 illustrates the receipt printed by the system.

The UPC supermarket system is designed for use with direct bagging checkstands to substantially improve customer throughput and checker productivity. As shown in FIGS. 1 and 2, installed at the check-out lane of a supermarket in a UPC system including a conveyor table 10 on which are placed a group of items selected by a customer from the shelves of the supermarket. These items are conveyed toward the window of an optical scanner 11 that examines the symbols printed on each item that is pulled across the window. As the scanner identifies each item, a terminal 12 responsive to signals from the scanner automatically retrieves the name of the item and its price.

In terminal 12, the scanning entry of an item initiates an item search action in the price description file located on a magnetic disc. This file contains pricing information and an abbreviated item description. After each item is scanned, the terminal visually displays a description of the item and its price on a display panel 13. The terminal performs all of the calculations for tax and change, and in its output section it prints on a tape 14 a customer receipt containing descriptions and prices of all items and totals.

Checkers are able to enter items that are not symbol-marked either by keying in an item number which appears on the item, in which case the systems supplies the price, or by keying in the price of the item directly. For this purpose, the terminal is provided with a manually operated keyboard 15.

The IBM 3660 system also includes a supermarket controller (not shown) that supervises up to twenty-four terminals and scanners and provides price look-up and item movement data on over 20,000 different items. At the end of the day or at any convenient time, summarized data can be transmitted to a central computer at the headquarters of the supermarket chain. With the present invention, the summarized data may include data relating to the coupons honored in the various stores linked to the central computer, so that a check may be made on the overall volume of coupon traffic and the relative trading in of coupons issued by various manufacturers.

With a UPC supermarket system, prices and price changes go into the computer, and when a price is changed this in no way requires any change in the symbol marked on the item, for all that need be changed is the price marked on the shelf. In other words, the customer to learn the price does not look to any marking on the item itself but only on the marking appearing on the shelf on which the item is stored, and he is again informed as to the price by the display panel at the check-out counter.

Figure 3:
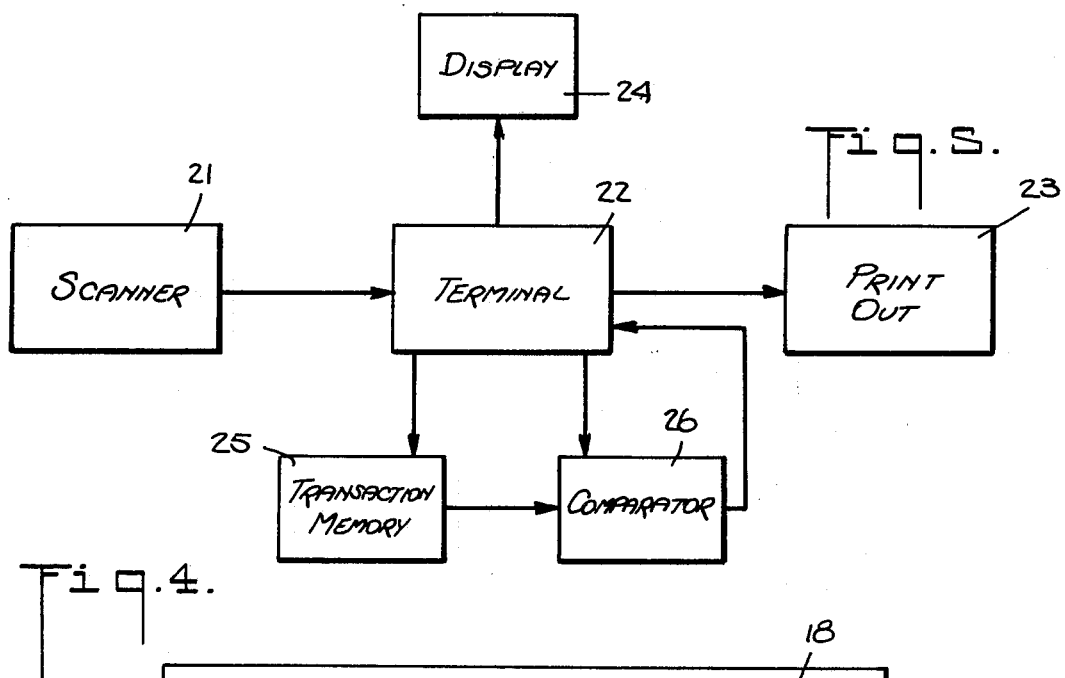
FIG. 3 shows a typical item carrying UPC indicia.

For purposes of illustration, we shall select as an item subject to a "cents-off" discount, a box of Kleenex tissues, as shown in FIG. 3. Printed in this box is a UPC symbol 16 whose code indicia are formed of a series of spaced bars of different width. Below this symbol is a code number 17 which also identifies the Kleenex box. Hence the UPC system, by scanning the symbol on the item on a Kleenex box, can retrieve its name and price, or it can carry out the same function when the code number is manually keyed into the system.

Figure 4:
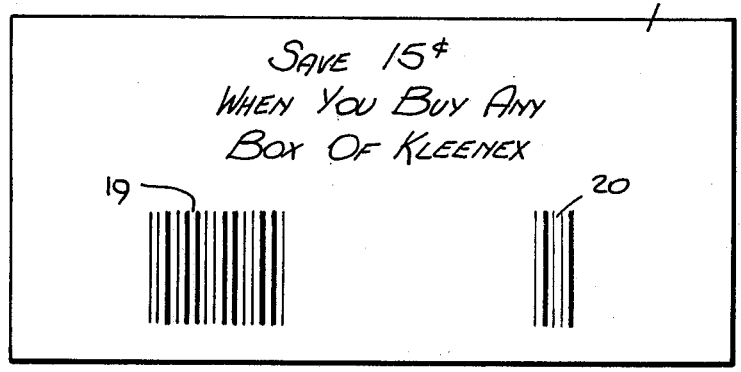
FIG. 4 is a UPC merchandising coupon in accordance with the invention.

Referring now to FIG. 4, there is shown a merchandise coupon 18 in accordance with the invention for a box of Kleenex tissues. The coupon has printed thereon a statement that the holder will receive 15 off when a box of Kleenex is purchased, and to this extent is similar to a conventional coupon. But also appearing on the coupon is code indicia constituted by a first component 19 which is identical to the UPC symbol 16 printed on the Kleenex box and a second component 20 which is also in the UPC bar form, but representing a "cents-off" condition, so that when component 20 is scanned and the resultant signal may be used to initiate an action appropriate to a coupon.

Hence when the coupon is examined by a UPC scanner, the first component 19 will produce the same signal produced by an actual box of Kleenex, whereas the second component 20 will produce a recognition signal indicating that a coupon has been scanned.

The UPC coupon may be used in a UPC system of the type shown in FIG. 5 wherein the system is arranged so that when a purchaser in a supermarket holds a coupon and he comes to the check-out lane with a group of items including a box of Kleenex, the checker first passes all of the items through a scanner 21 to retrieve the names and prices of these items in terminal 22 to produce a receipt in print-out section 23. As each item in the group is scanned, its name and price appear in display panel 24 in the usual manner.

Then the checker who has received the UPC coupon from the purchaser, presses on the keyboard the merchandise coupon key to ready the system for coupon analysis. This key action causes all items in the purchased group previously scanned to enter a transaction memory 25 which may be in magnetic disc or any other suitable form. The coupon is then run through the scanner and the signal resulting from the first component 19 is fed to a comparator 26 where it is compared with the group of signals stored in memory 25 to see whether a match exists with any item in the group.

Since the group includes a Kleenex item, a match will be found, and when the second component signal is received, the coupon will be honored by having the comparator signal the terminal to determine the amount to be deducted from a Kleenex box sale and to deduct 15 from the total. This deduction appears in the print-out and also on the display. Should a match not be found, the coupon will not be honored and a notice to this effect may be presented by the display. One may in connection with the system also include a cancellation device to perforate or otherwise mark a coupon that has been honored to prevent its reuse.

In the above arrangement, coupon analysis is initiated by operation a coupon key. But one may arrange the system so that first the second component 20 on the coupon is scanned to put the system in the coupon analysis mode, before the item symbol 19 is scanned. Hence the system will not treat the coupon as an ordinary item and will act in response to the scanned symbol to effect the required deduction. One can also do away with the second component, in which event the system must be arranged by key operation to process coupons containing UPC symbols.

While there have been shown and described preferred embodiments of a coded merchandising coupon, it will be appreciated that many changes and modifications may be made therein without, however, departing from the essential spirit thereof.

I claim:

1. In a supermarket system adapted to check-out consumer items, each bearing a distinctive symbol based on the universal product code, the combination comprising:

A a merchandise coupon entitling the holder thereof to a specified discount on one of said items, said coupon having printed thereon a symbol corresponding to the symbol appearing on said one item;

B an optical scanning unit to scan the symbols on said items and on said coupon to produce signal representative thereof, and C a terminal responsive to signals derived from scanning a group of said items selected by the holder and including means to retrieve the name and price of each item in the group of selected items and to produce an output record in which these items and their prices are identified, said computer further including a memory to store the signals derived from the symbols borne by the items in said group, said terminal being thereafter responsive to a signal derived from scanning said coupon and having means to compare the coupon signal with the stored signal to accord to said holder on said record the benefit of said specified discount only if the coupon signal matches one of the stored signals in the group of items.

2. In a system as set forth in claim 1, wherein said coupon further has printed thereon a second symbol indicative of the fact that it is a merchandise coupon.

3. In a system as set forth in claim 2, wherein said terminal includes means responsive to a signal derived from scanning said second symbol to accord to the holder said discount only if said match exists.

4. The method of redeeming merchandise coupons having specified discounts and avoiding misredemption thereof, said method comprising the steps of scanning a group of items bearing universal product code symbols to produce signals for operating a supermarket terminal adapted to retrieve the prices of these items and to produce a read-out totaling the items purchased;

storing the signals derived from the scanned items; and scanning a coupon bearing a universal product code symbol to produce a signal representing the coupon and comparing the coupon signal with each of the stored item signals to determine whether a match exists with one of the item signals, and deducting the discount specified on the coupon from said total if said scanning symbol matches that borne by one of the items in said group.

* * * * *

UNITED STATES PATENT OFFICE
CERTIFICATE OF CORRECTION

PATENT NO. : 3,959,624
DATED : May 25, 1976
INVENTOR(S) : Walter Kaslow

It is certified that error appears in the above-identified patent and that said Letters Patent are hereby corrected as shown below:

```
Column 1, line 29 "offer" should have read -- offering --
          line 29 "15  off" should have read -- 15¢ off --
          line 32 " 15  reduction" should have read
-- 15¢ reduction --
          line 34 "15  discount" should have read
-- 15¢ discount --
          line 61 "then" should have read -- them --
          line 63 "then" should have read -- them --

Column 2, line 11 "100 dollar million" should have read
-- $100 million --
          line 29 "accurate" should have read -- accurately --
Column 5, line 29 "15  off" should have read -- 15¢ off --
Column 6, line 2 "15  from" should have read -- 15¢ from --
          line 10 "operation" should have read -- operating --
```

Signed and Sealed this

Third Day of August 1976

[SEAL]

Attest:

RUTH C. MASON
Attesting Officer

C. MARSHALL DANN
Commissioner of Patents and Trademarks

Disclaimer and Dedication 3,959,624.—*Walter Kaslow*, New York, N.Y. CODED MERCHANDISING COUPON. Patent dated May 25, 1976. Disclaimer and Dedication filed Nov. 15, 1983, by the *inventor*.

Hereby disclaims and dedicates to the Public the remaining term of said patent.

[*Official Gazette March 20, 1984.*]